United States Patent [19]

Blumenau

[11] Patent Number: 5,875,478
[45] Date of Patent: Feb. 23, 1999

[54] COMPUTER BACKUP USING A FILE SYSTEM, NETWORK, DISK, TAPE AND REMOTE ARCHIVING REPOSITORY MEDIA SYSTEM

[75] Inventor: Steven M. Blumenau, Holliston, Mass.

[73] Assignee: EMC Corporation, Hopkinton, Mass.

[21] Appl. No.: 757,125

[22] Filed: Dec. 3, 1996

[51] Int. Cl.⁶ .................................................. G06F 12/00
[52] U.S. Cl. ................................. 711/162; 395/182.04
[58] Field of Search ......................... 395/182.13, 200.33; 707/10; 711/162

[56] References Cited

U.S. PATENT DOCUMENTS

| | | |
|---|---|---|
| 5,235,601 | 8/1993 | Stallmo et al. . |
| 5,305,438 | 4/1994 | MacKay et al. . |
| 5,337,414 | 8/1994 | Hashemi et al. . |
| 5,367,698 | 11/1994 | Webber et al. . |
| 5,390,187 | 2/1995 | Stallmo . |
| 5,398,253 | 3/1995 | Gordon . |
| 5,435,004 | 7/1995 | Cox et al. . |
| 5,463,772 | 10/1995 | Thompson et al. . |
| 5,495,607 | 2/1996 | Pisello et al. ............................. 707/10 |
| 5,497,457 | 3/1996 | Ford . |
| 5,499,337 | 3/1996 | Gordon . |
| 5,504,858 | 4/1996 | Ellis et al. . |
| 5,537,585 | 7/1996 | Blickenstaff et al. .................. 707/205 |
| 5,566,331 | 10/1996 | Irwin, Jr. et al. ......................... 707/10 |
| 5,644,766 | 7/1997 | Coy et al. ............................... 707/204 |
| 5,671,350 | 9/1997 | Wood ................................... 395/182.13 |

*Primary Examiner*—Tod R. Swann
*Assistant Examiner*—David Langjahr
*Attorney, Agent, or Firm*—Fish & Richardson P.C.

[57] ABSTRACT

A computer having backup capabilities for backing up data on a host storage disk of the computer to a remote archive repository, the computer including a backup application that determines when data to be backed up should be copied to the remote archive repository and makes read requests to make a copy of data on the host storage disk and makes write requests to store the copy at the remote archive repository, the computer also including a backup system that receives the write requests and the copy of data and has a remote procedure call interface for transmitting the data to the remote archive repository.

23 Claims, 10 Drawing Sheets

COMPUTER BACKUP USING A FILE SYSTEM, NETWORK, DISK, TAPE AND REMOTE ARCHIVING REPOSITORY MEDIA SYSTEM

CROSS REFERENCE TO RELATED APPLICATIONS

Patent applications entitled "Restoration of Data Backed up on Archive Media" Ser. No. 08/753,952, "Mirroring Computer Data" Ser. No. 08/757,951, "Redundant Storage of Computer Data" Ser. No. 08/757,122, and "Hierarchial Performance System" Ser. No. 08,757,124, filed by me concurrently herewith, are incorporated herein by reference.

BACKGROUND OF THE INVENTION

The invention relates to backing up computer data on a host computer storage disk.

Computer data are often backed up, i.e., copied, to a storage medium other than the host computer's storage disk, to permit the recovery of the data as they existed at some point in time in the event of system failure or inadvertent loss of data. The data can be automatically backed up on a daily or other periodic basis and stored on tape or optical archive media.

With some desktop personal computers, backup is done manually on an erratic schedule, with the user of the desktop being responsible for keeping track of the backup media. There are backup applications that provide backup for data stored on a desktop computer by writing to diskettes or to an additional tape or disk drive associated with the computer. These applications can have a facility for automatic backup but rely on the user to put new media into a tape drive.

In general there are two ways to back up data: physical level backup and logical level backup. The term "physical level" refers to the data as stored at specific locations on some physical media such as a host computer disk. The term "logical level" refers to the data as seen by the user application programs in files or database tables. Typically the computer's operating system (e.g., UNIX or DOS) includes a file system that does mapping between the physical level and the logical level. Physical level backup involves making a raw copy from a computer disk to an archive medium without going through the file system or other physical to logical interpreter. Logical level backup involves using an interpreter (e.g., a file system) while doing backup to do physical to logical mapping.

SUMMARY OF THE INVENTION

In one aspect, the invention features in general a computer having backup capabilities for backing up data on a host storage disk of the computer to a remote archive repository. The computer includes a backup application that determines when data to be backed up should be copied to the remote archive repository and makes read requests to make a copy of data on the host storage disk and makes write requests to store the copy at the remote archive repository. The computer also includes a backup system that receives the write requests and the copy of data and has a remote procedure call interface for transmitting the data to the remote archive repository.

In another aspect the invention features in general a computer system including a plurality of desk top computers that are connected to a network to which a remote archive repository is connected. The computers each have a backup application and backup system as have already been described and send copies of data to be backed up to the common remote archive repository.

In another aspect the invention features in general a computer implemented method of backing up data on a host storage disk of the computer to a remote archive repository. The method includes determining, at a backup application, when data to be backed up should be copied to the remote archive repository, making a read request to make a copy of data on the host storage disk, and making a write request to store the copy at the remote archive repository. The method also includes receiving the write request and the copy of data at a backup system and transmitting the data from the backup system via a remote procedure call interface to the remote archive repository.

In another aspect the invention features a computer program that resides on a computer-readable medium and includes instructions causing the computer to create a backup application and a backup system as have already been described.

Certain implementations of the invention may include one or more of the following features. In certain implementations: the backup system has a tape driver interface to the backup application for receiving physical block level write requests from the backup application; alternatively, the computer's file system maps logical read and write requests to physical block level read and write requests, and the backup system has a disk driver interface to the file system for receiving the block level write requests from the file system. In certain implementations a database server application receives the read and write request from the backup application and maps the write requests to physical block lever write requests prior to receipt at the backup system; the backup system includes a backup driver and an archive media system, the backup driver receiving the write requests and also having an operating system device driver application programming interface to the archive media system, the archive media system being implemented in the user space of the computer and communicating with the remote archive repository; and the remote archive repository includes a control program and a tape library.

Embodiments of the invention may have one or more of the following advantages. Backup for a computer is provided at a remote archive repository without the need for additional hardware at the computer. A large number of computers can share the remote archive repository. The backup application can automatically do periodic backup without requiring intervention by the user of the desktop. The approach is portable across different vendors' implementations of an operating system and different backup applications and also across different operating systems.

Other advantages and features of the invention will be apparent from the following description of preferred embodiments and from the claims.

DESCRIPTION OF THE PREFERRED EMBODIMENTS

Figure 1:
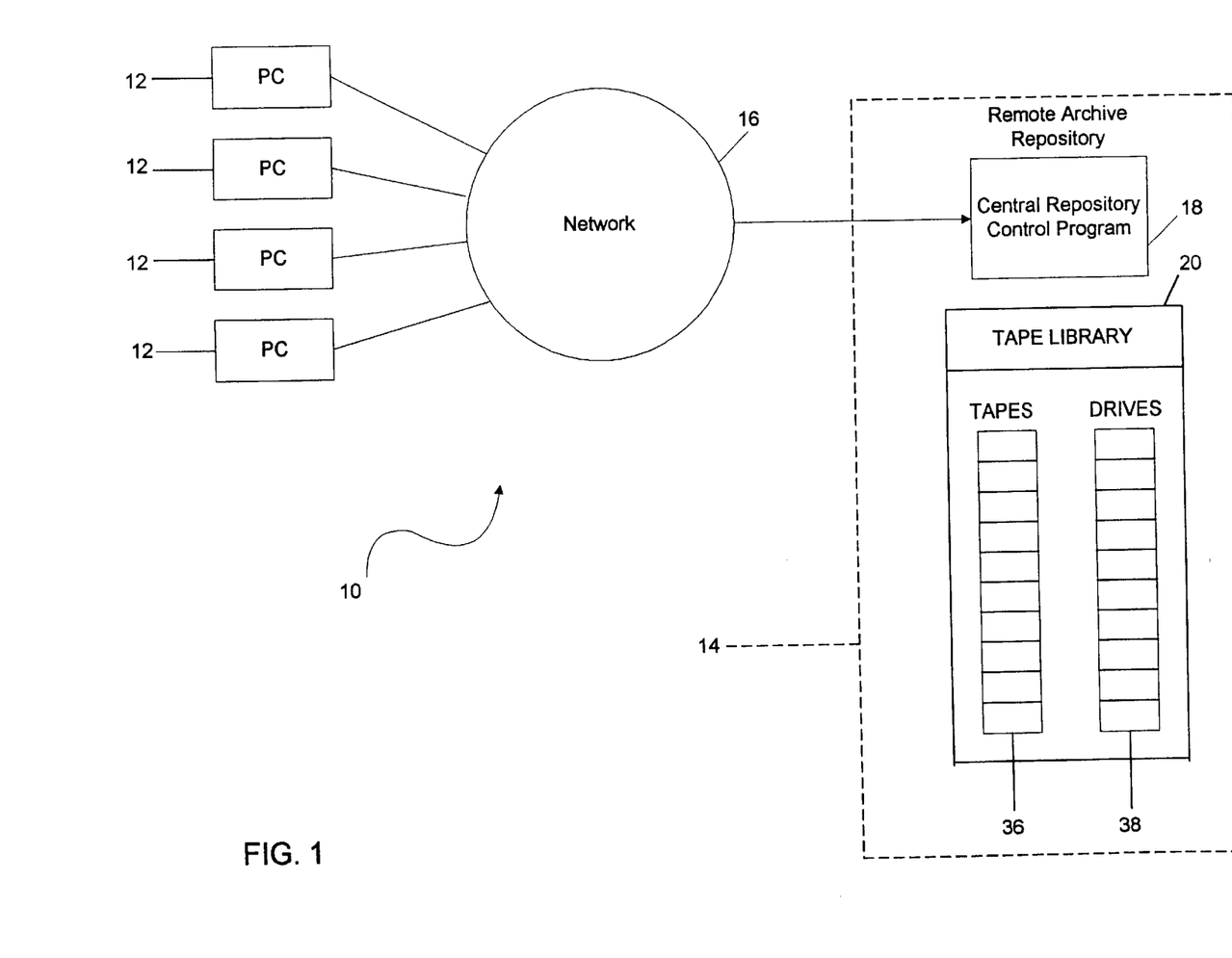
FIG. 1 is a block diagram of system for backup of data on a plurality of computers connected to a network.

Referring to FIG. 1, there is shown networked computer system 10. It includes a large number of desktop or other computers 12 and remote archive repository 14 all connected over network 16, which can be a local area or wide area network. Remote archive repository 14 includes repository control program 18 and tape library 20, though other archive media besides tape can be employed.

Figure 2:
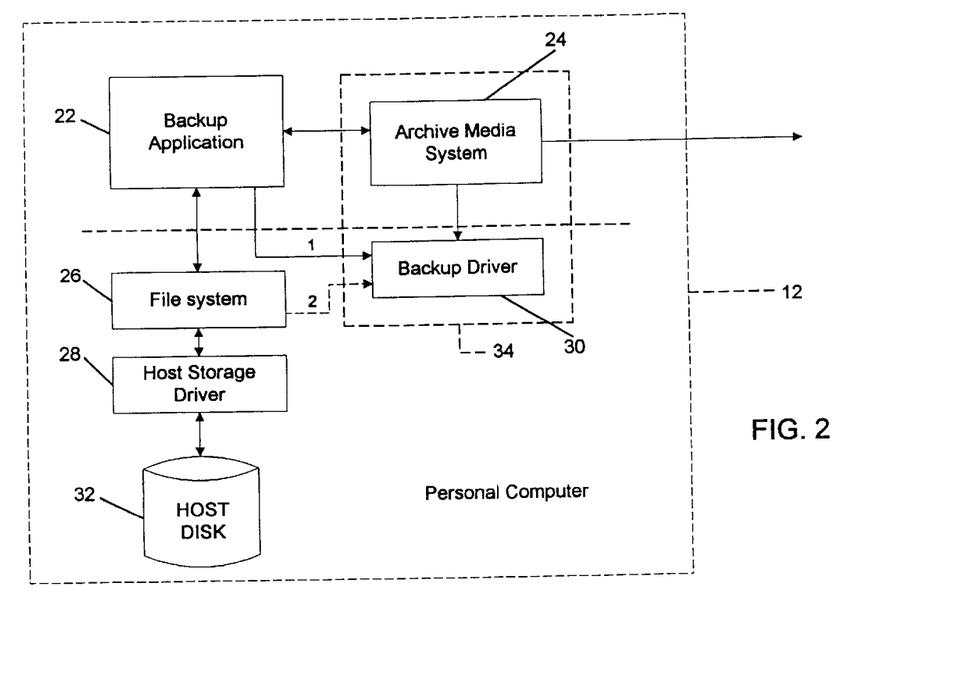
FIG. 2 is a diagram of a computer of the FIG. 1 system.

Referring to FIG. 2, computer 12 includes backup application 22 and archive media system 24 in the user application space of the computer. Computer 12 also includes file system 26 (e.g., the file system present in a UNIX operating system), host storage driver 28, and backup driver 30 in the kernel space of the computer and host disk 32. Archive media system 24 is connected to communicate with remote archive repository 14 through network 16. Backup driver 30 and archive media system 24 together make up backup system 34.

File system 26, host storage driver 28, and host disk 32 are common components of a computer. File system 26 and host storage driver 28 are provided in the operating system of a computer, and disk 32 is the physical medium on which the data are actually stored. A "block" of data (which might be 512 or 1K bytes or larger depending on the computer and the media type) is the smallest set of data that can be accessed on the physical media. File system 26 carries out a logical to physical mapping; given a file name, it accesses file tables to determine where the file is actually physically located and converts a file name to a set of physical blocks. The file tables, which are stored along with actual data on disk 32, identify, for each file name, the starting block and the number of blocks in the file.

Figure 7A:
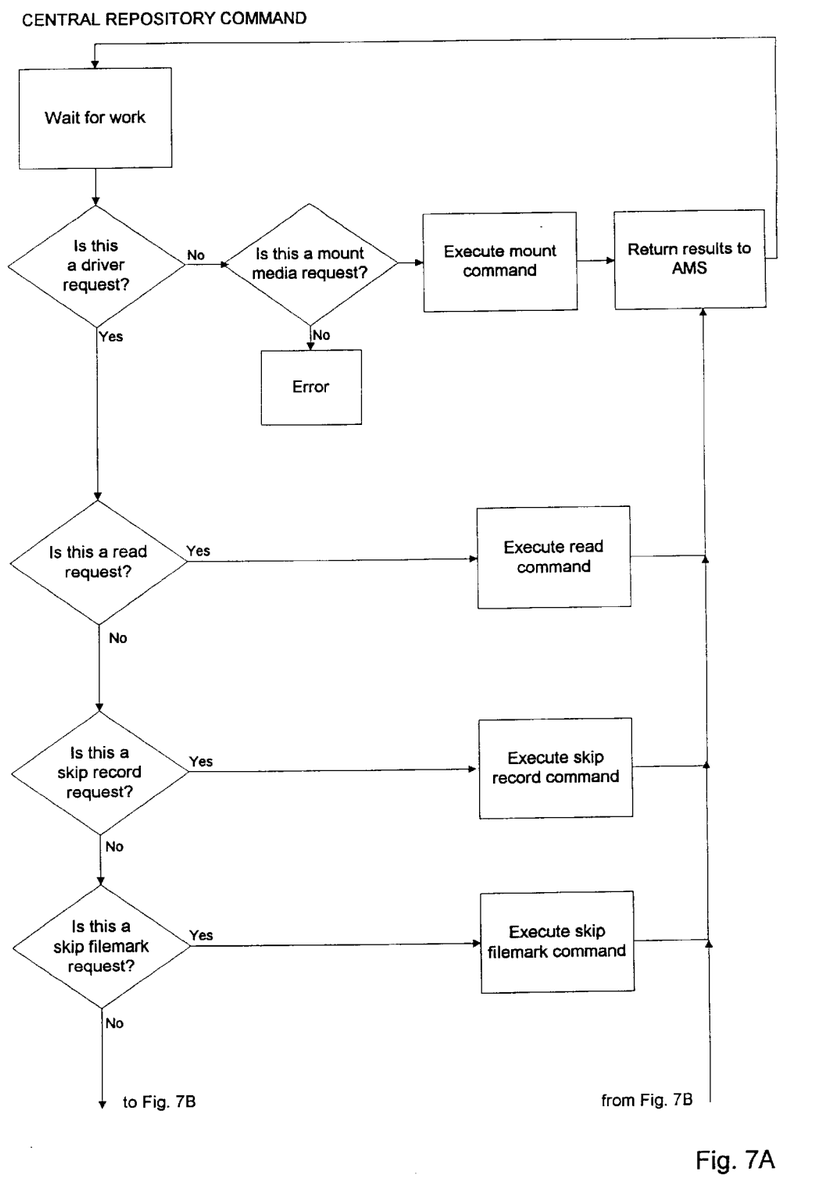
FIGS. 7A–7B are a flow chart showing the steps employed by a central repository control program of the FIG. 1 system.
Figure 7B:
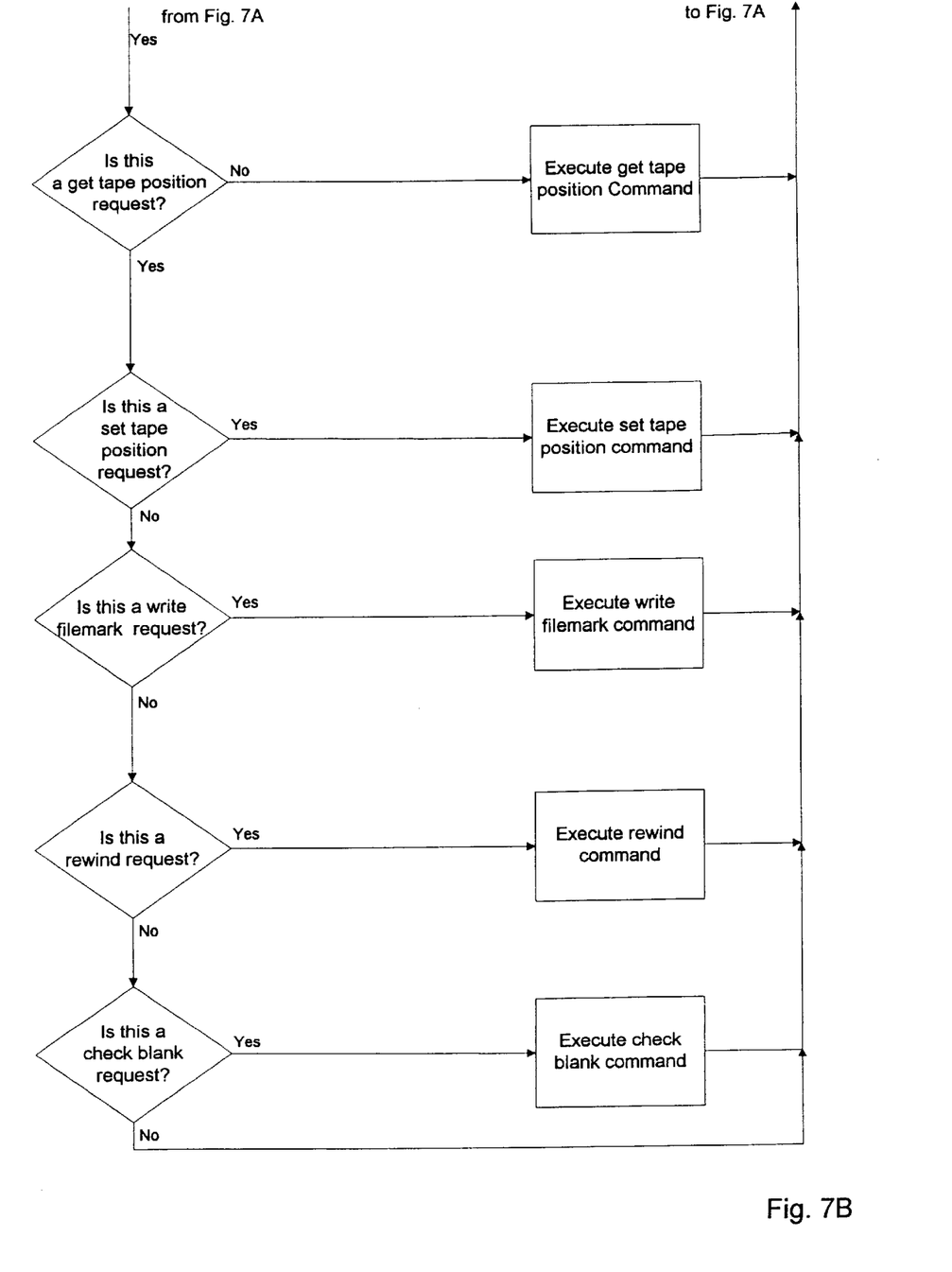

Tape library 20 (FIG. 1) includes a plurality of tapes 36, drives 38 to access the tapes, and a robot (not shown) to move tapes into drives. The data backed up in a physical level backup of disk 32 include the file tables used by file system 26 to correlate file names with physical blocks. FIGS. 7A–7B are a flow chart showing the steps employed by central repository control program 18 to store backed up information and access tapes 36 and drives 38. On FIGS. 7A–7B, the mount media request relates to mounting a tape on a tape drive. Files on a tape are separated by filemarks, and files can be skipped over by a "skip filemark request." The present position of a tape in a drive is obtained by a "get tape position request." A "write filemark" request causes a filemark to be written. A "rewind" request causes a tape to be rewound. A "check blank" request is used to check that a tape is blank.

Backup application 22 determines when a backup should be copied to remote archive repository 14 and makes read requests to make a copy of data from host storage disk 32 and makes write requests to store the copy at remote archive repository 14.

Backup driver 30 can communicate directly with backup application 22 (as indicated by solid line 1 on FIG. 2), in which case backup driver 30 would have a tape driver interface to backup application 22. When backup driver 30 has a tape driver interface to backup application 22, backup application 22 specifies the physical blocks that are to be backed up to backup driver 30. An advantage of this approach is that any backup application on a desktop that supports a tape drive (using a tape driver interface) can be used.

Alternatively, backup driver 30 can communicate with file system 26 (as indicated by dashed line 2 in FIG. 2), in which case backup driver 30 would have a disk driver interface to file system 26. When backup driver 30 has a disk driver interface to file system 26, it looks like a disk driver to file system 26, but its function is to communicate with archive media system 24 and to transfer the blocks of information specified by file system 26. In this case, backup application 22 identifies a file to be backed up to file system 26, and file system 26 identifies the physical blocks that are to be backed up to backup driver 28.

Figure 5A:
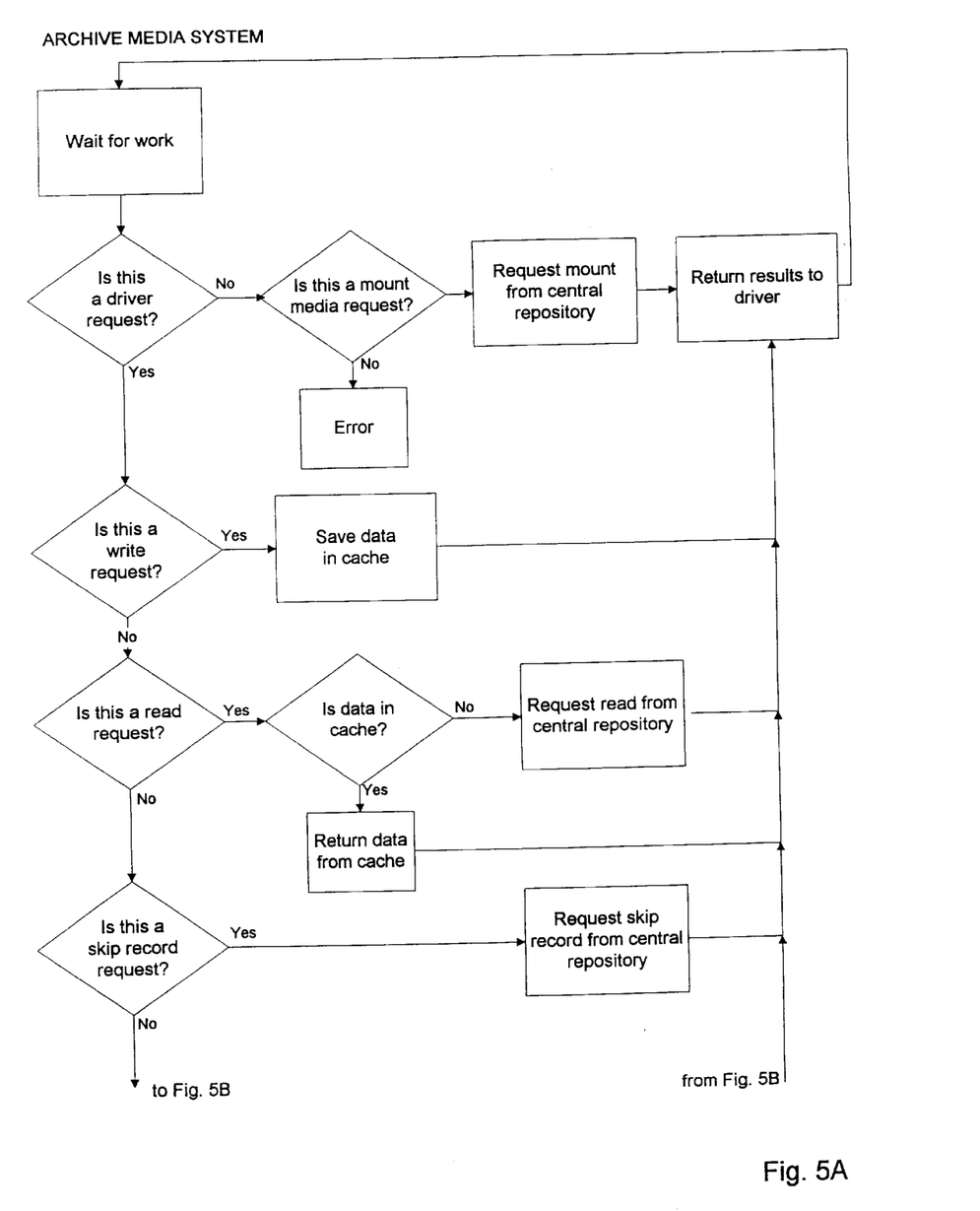
FIGS. 5A–5B are a flow chart showing the steps employed by an archive media system of a computer of the FIG. 1 system.
Figure 5B:
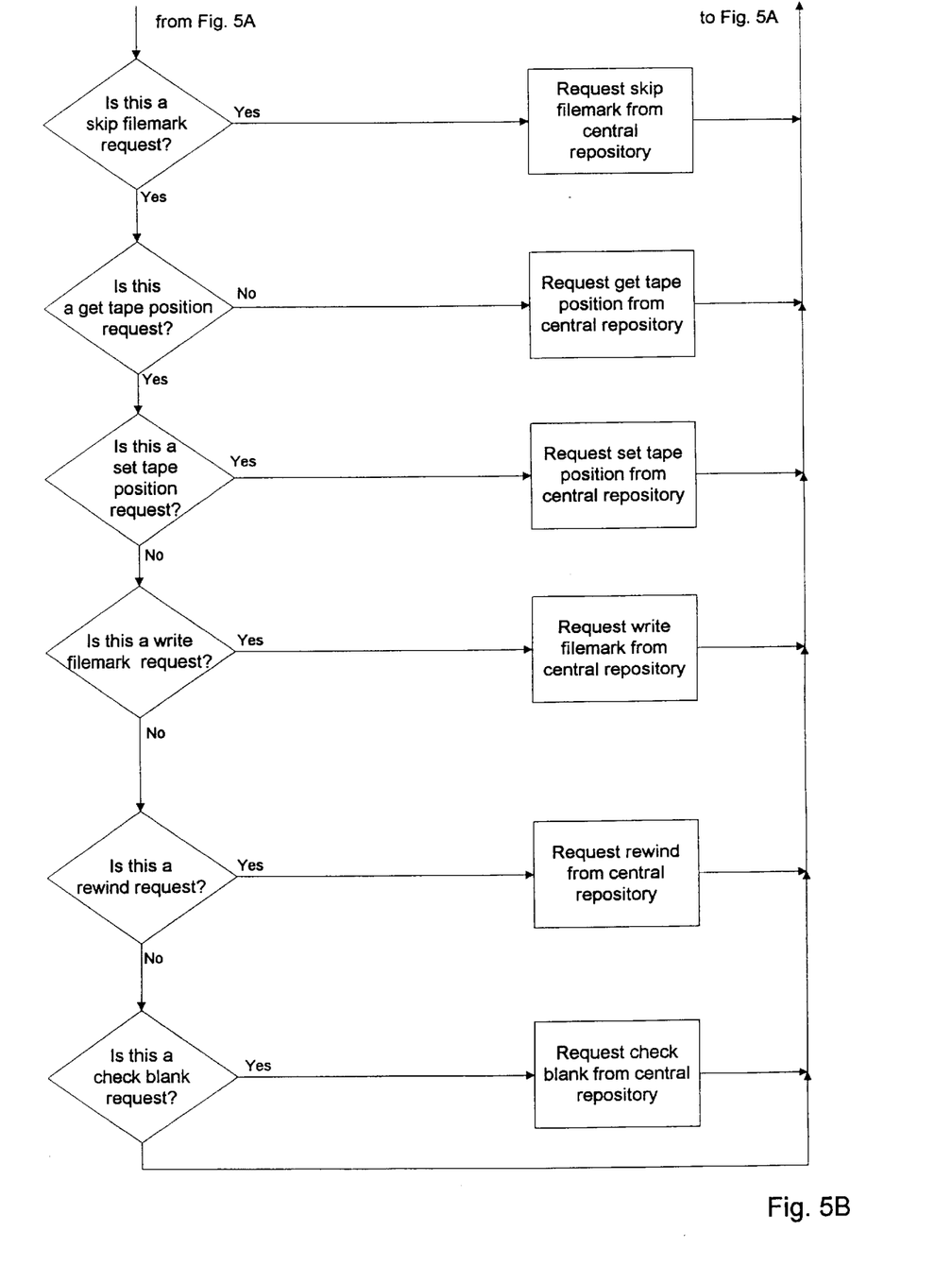

Archive media system 24 processes both read and write requests. FIGS. 5A–5B are a flow chart showing the steps employed by archive media system 24. Archive media system 24 uses the network identifier for its respective computer 12 to identify the backup data being stored at remote archive repository 14. Archive media system 24 has a remote procedure call interface for transmitting data to remote archive repository 14. When blocks of data are sent from desktop computers 12 to remote archive repository 14, they are tagged with information as to which computer they came from (this is inferred from the network address) and the device name and the physical block number. Archive media system 24 also has a user interface to identify the data set to be restored.

Backup driver 30 has an operating system device driver application programming interface to archive media system 24. In a Unix operating system environment, archive media system 24 and backup driver 30 can communicate via IOCTL messages, which have the following format: (operation, address of a given buffer, optional arguments). When first started up, archive media system 24 makes an IOCTL call to backup driver 30; there would initially not be a return of the call, because there would not be any requests to process.

Before a request to backup data can be processed, the archive media must be specified. Archive media system 24 has a remote procedures call (RPC) interface to backup application 22 that is used to allow backup application 22 to specify the media that needs to be mounted. Once the media mount has been satisfied by media archive system 24, all I/Os are done directly to and from backup driver 30. When backup application 22 makes a request to back up data, the date and time of the open are used to mark the time of the backup. Backup driver 30 responds like a tape driver (when path 1 is used) or a disk driver (when path 2 is used) to backup application 22, and gets data from and sends data to archive media system 24.

Figure 6A:
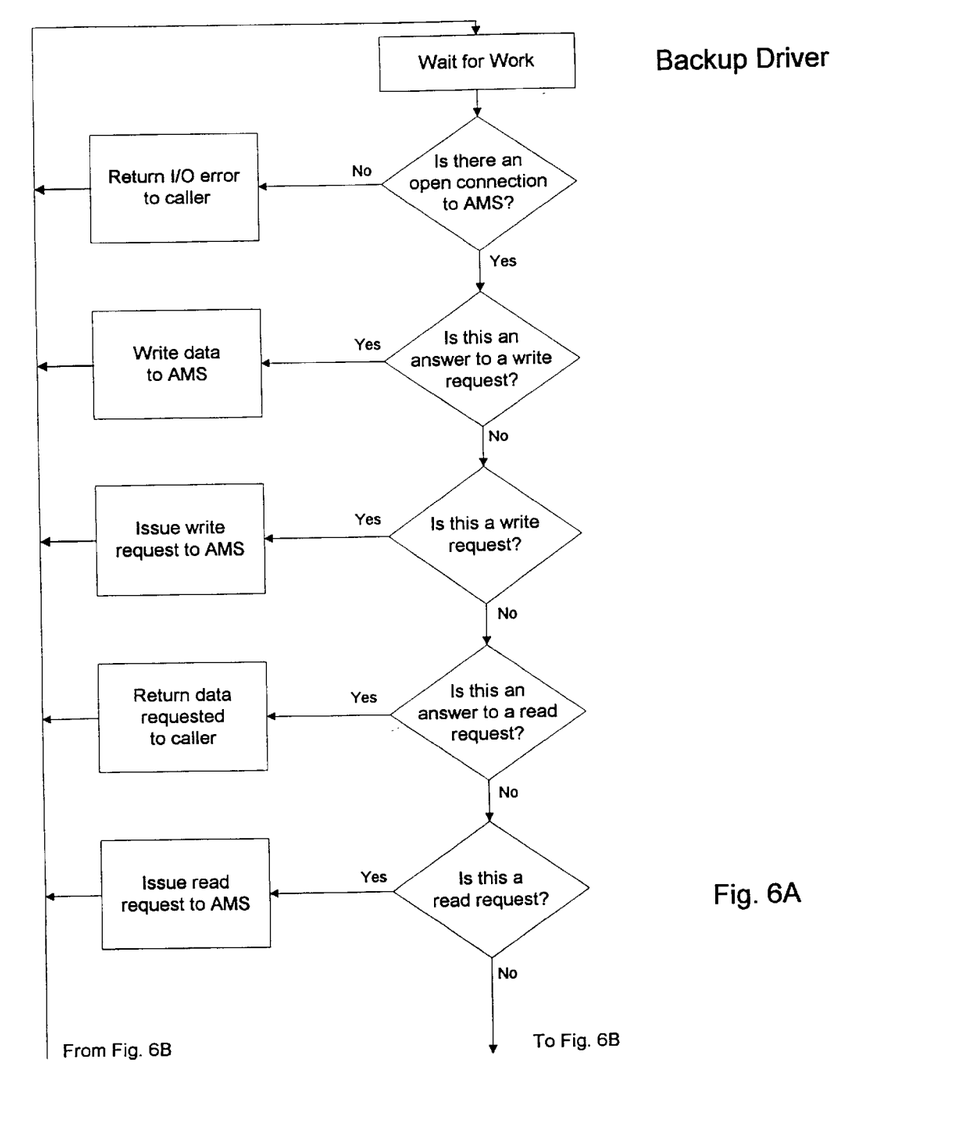
FIGS. 6A–6C are a flow chart showing the steps employed by a backup driver of a computer of the FIG. 1 system.
Figure 6B:
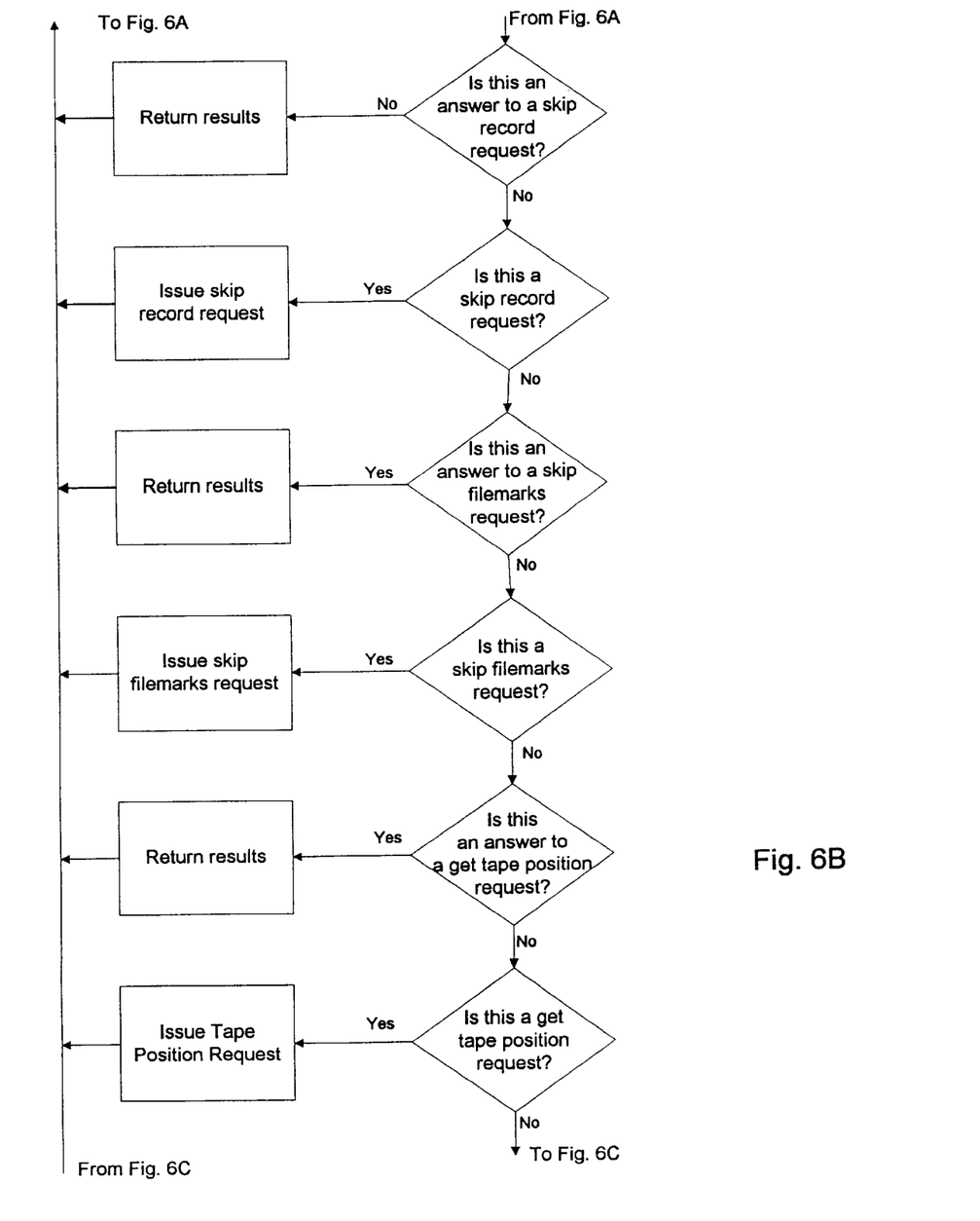
Figure 6C:
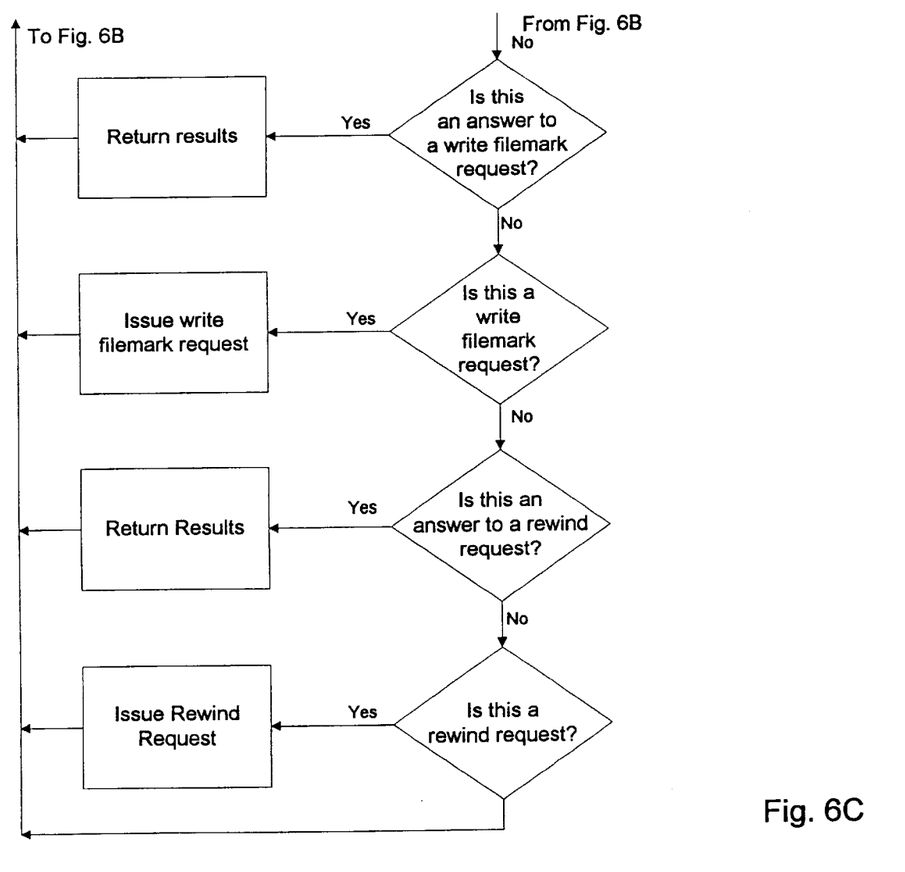

FIGS. 6A–6C are a flow chart showing the steps employed by backup driver 30. When there is a pending request, the IOCTL call is returned by backup driver 30, and archive media system 24 looks at the return values of the IOCTL, which specify whether the operation is a read or write, and the starting block number. If the operation is a write, the return includes the data being written, which are then transmitted to tape library 20 (or other archive media). Archive media system 24 then sends another IOCTL call and waits for backup driver 30 to return the IOCTL return when there is another request to process. FIGS. 6A–6C also show the various other requests relating to controlling tape library 20.

In system 10 a large number of computers 12 share remote archive repository 14 for backup, avoiding the need for additional hardware at the individual computers. The use of backup driver 30 makes the approach portable across different vendors' implementations of an operating system and also across different operating systems, and permits one to use off-the-shelf backup programs for backup application 22.

Figure 3:
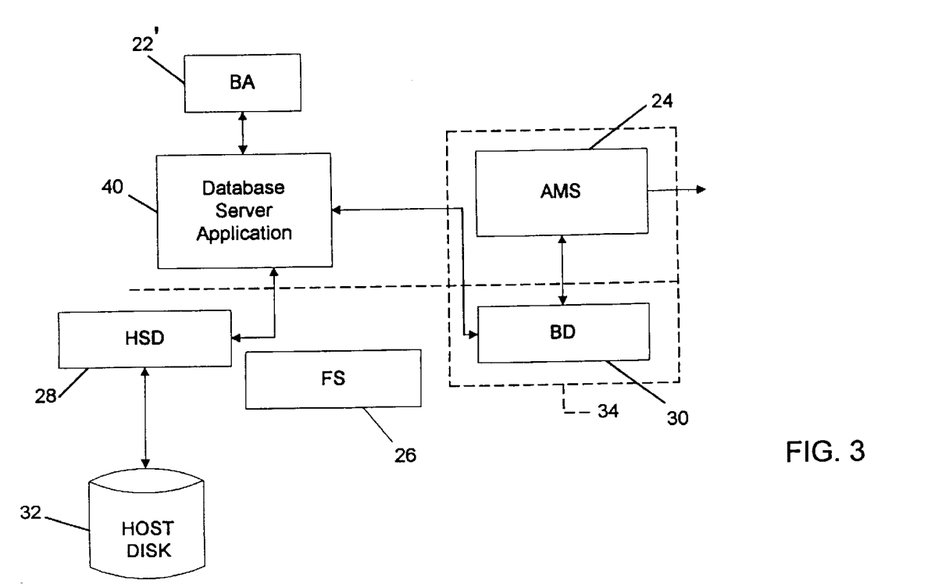
FIGS. 3 and 4 are a block diagrams of alternative embodiments of computers in the FIG. 1 system.
Figure 4:
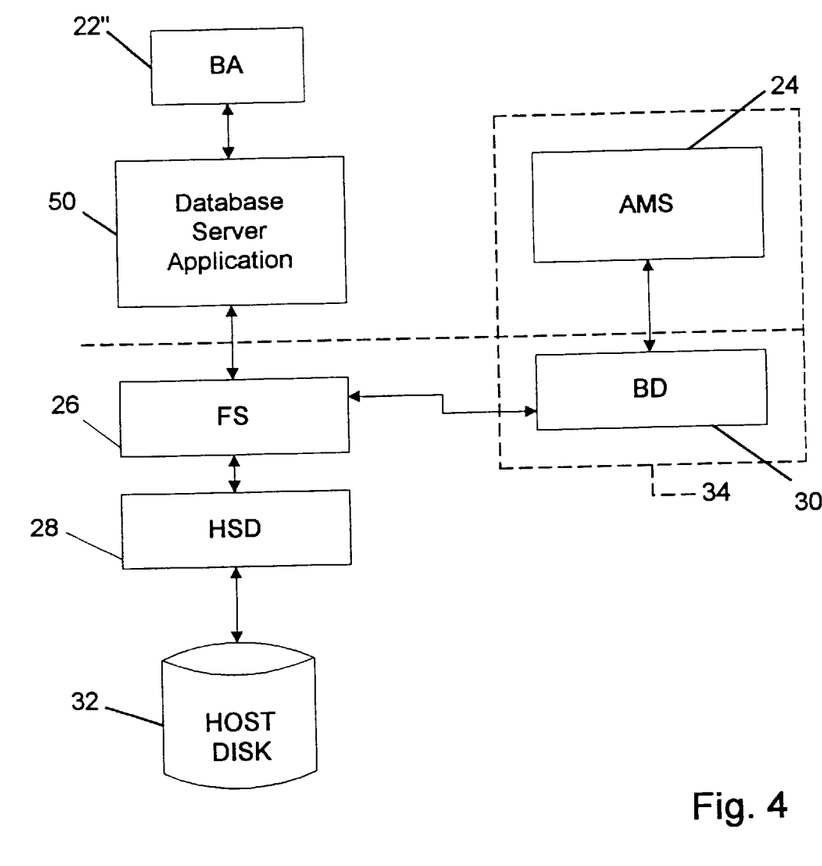

FIGS. 3 and 4 show alternative embodiments involving data base server applications 40 (FIG. 3) and 50 (FIG. 4). The same reference numbers as on FIG. 2 are used for like components on FIGS. 3 and 4, and abbreviations are used for elements that already appear on FIG. 2. In the FIG. 3 embodiment, data base server application 40 does not run on file system 26. In the FIG. 4 embodiment, data base server application 50 does run on file system 26.

Referring to FIG. 3, backup application 22' now communicates with data base server application 40, e.g, through SQL. Database server application 40 does logical to physical mapping on a so-called raw partition that bypasses file system 26 and communicates directly with the drivers. The data base server application accesses data based on tables, rows, and columns, whereas a file system accesses data based on file names and bytes of information in the file. With data base server application 40, there essentially is another level of mapping. E.g., if backup application 22' asks for table A in a data base, data base server application 40 converts table A to the appropriate physical level block. Data base server application 40 thus makes the full mapping from a request for table A all the way down the physical level and makes the request directly to backup driver 30. Examples of such database server applications are commercially available applications available under the Oracle, Informix or Sybase trade designations.

Referring to FIG. 4, data base server application 50 is running on file system 26 and translates the requests from backup application prior to passing them on to file system 26. E.g., if backup application 22" asks for table A in a data base, data base server application 50 converts table A to the appropriate block of a file, e.g., logical block 12 of a file named "database A".) File system 26 receives a request for logical block 12 of file "database A," and converts that to the physical level, e.g., physical block 1000 of the physical media.

Other Embodiments

Other embodiments of the invention are within the scope of the appended claims. E.g., backup application 22, if custom designed, could interact directly with archive media system 24 and thus avoid the need of backup driver 30.

What is claimed is:

1. A computer having backup capabilities for backing up a copy of data from a host storage disk of said computer to a remote archive repository, said computer comprising     a backup application which determines when data on said host storage disk to be backed up should be copied to said remote archive repository and makes read requests to make a copy of data on said host storage disk and makes write requests to store said copy at said remote archive repository, and     a backup system which receives said write requests and said copy of data and having a remote procedure call interface for transmitting said data to said remote archive repository, said data remaining on said host storage disk.

2. The computer of claim 1 wherein said read and write requests are block level read and write requests and wherein said backup system has a tape driver interface to said backup application for receiving said block level write requests from said backup application.

3. The computer of claim 1 wherein said read and write requests are logical read and write requests, and further comprising a file system that maps logical read and write requests to physical block level read and write requests, and wherein said backup system has a disk driver interface to said file system for receiving said block level write requests from said file system.

4. The computer of claim 1 wherein said read and write requests are logical read and write requests, and further comprising a database server application that receives said logical write requests from said backup application and maps said logical write requests to physical block level write requests prior to receipt at said backup system.

5. The computer of claim 1 wherein said backup system includes a backup driver and an archive media system, said backup driver receiving said write requests and also having an operating system device driver application programming interface to said archive media system, said archive media system being implemented in the user space of said computer and communicating with said remote archive repository.

6. A computer system comprising a network, a remote archive repository connected to said network, and     a plurality of desk top computers that are connected to said network and have backup capabilities for backing up data on respective host storage disks of said computers to said remote archive repository, each said computer comprising     a backup application which determines when data on said host storage disk of said computer to be backed up should be copied to said remote archive repository and makes read requests to make a copy of data on said host storage disk and makes write requests to store said copy at said remote archive repository, and     a backup system which receives said write requests and said copy of data and has a remote procedure call interface for transmitting said data to said remote archive repository said data remaining on said host storage disk.

7. The computer system of claim 6 wherein said read and write requests are block level read and write requests and wherein said backup system has a tape driver interface to said backup application for receiving said block level write requests from said backup application.

8. The computer system of claim 6 wherein said read and write requests are logical read and write requests, and wherein said computers each further comprise a file system that maps logical read and write requests to physical block level read and write requests, and wherein said backup system in at least some of said computers has a disk driver interface to said file system for receiving said block level write requests from said file system.

9. The computer system of claim 6 wherein at least one of said computers further comprises a database server application that receives said read and write requests from said backup application as logical read and write requests and maps said logical write requests to physical block level write requests prior to receipt at said backup system.

10. The computer system of claim 6 wherein said backup system includes a backup driver and an archive media system, said backup driver receiving said write requests and also having an operating system device driver application programming interface to said archive media system, said archive media system being implemented in the user space of said computer and communicating with said remote archive repository.

11. The computer system of claim 6 wherein said remote archive repository includes a control program and a tape library.

12. A computer implemented method of backing up a copy of data from a host storage disk of said computer to a remote archive repository, said method comprising determining at a backup application when data on said host storage disk to be backed up should be copied to said remote archive repository, making at said backup application read requests to make a copy of data on said host storage disk, making write requests to store said copy at said remote archive repository, receiving said write requests and said copy of data at a backup system having a remote procedure call interface, and transmitting said data from said backup system via said remote procedure call interface to said remote archive repository, said data remaining on said host storage disk.

13. The method of claim 12 wherein said read and write requests are block level read and write requests and wherein said backup system has a tape driver interface to said backup application for receiving said block level write requests from said backup application.

14. The method of claim 12 wherein said read and write requests are logical read and write requests, and further comprising mapping logical read and write requests to physical block level read and write requests at a file system, and wherein said backup system has a disk driver interface to said file system for receiving said block level write requests from said file system.

15. The method of claim 12 wherein said computer further comprises a database server application that receives said read and write requests from said backup application as logical read and write requests and maps said logical write requests to physical block level write requests prior to receipt at said backup system.

16. The method of claim 12 wherein said backup system includes a backup driver and an archive media system, said backup driver receiving said write requests and also having an operating system device driver application programming interface to said archive media system, said archive media system being implemented in the user space of said computer and communicating with said remote archive repository.

17. The method of claim 12 wherein said remote archive repository includes a control program and a tape library.

18. The method of claim 12 wherein there are a plurality of said computers.

19. A computer program for implementation on a computer to back up data on a host storage disk of said computer to a remote archive repository, said computer program residing on a computer-readable medium and comprising instructions causing said computer to create a backup application which determines when data on said host storage disk to be backed up should be copied to said remote archive repository and makes read requests to make a copy of data on said host storage disk and makes write requests to store said copy at said remote archive repository, and a backup system that receives said write requests and said copy of data and has a remote procedure call interface for transmitting said data to said remote archive repository said data remaining on said host storage disk.

20. The computer program of claim 19 wherein said read and write requests are block level read and write requests, and wherein said backup system has a tape driver interface to said backup application for receiving said block level write requests from said backup application.

21. The computer program of claim 19 wherein said read and write requests are logical read and write requests, and wherein said computer has a file system that maps logical read and write requests to physical block level read and write requests, and wherein said backup system has a disk driver interface to said file system for receiving said block level write requests from said file system.

22. The computer program of claim 19 wherein said computer has a database server application that receives said read and write requests from said backup application as logical read and write requests and maps said logical write requests to physical block level write requests prior to receipt at said backup system.

23. A computer having backup capabilities for backing up a copy of data from a host storage disk of said computer to a remote archive repository, said computer comprising a backup application which determines when data on said host storage disk to be backed up should be copied to said remote archive repository and makes read requests to make a copy of data on said host storage disk and makes write requests to store said copy at said remote archive repository, said read and write requests being block level read and write requests, and a backup system which receives said write requests and said copy of data and has a remote procedure call interface for transmitting said data to said remote archive repository, said backup system having a tape driver interface to said backup application for receiving said block level write requests from said backup application, said backup system including a backup driver and an archive media system, said backup driver receiving said write requests and also having an operating system device driver application programming interface to said archive media system, said archive media system being implemented in the user space of said computer and communicating with said remote archive repository, said data remaining on said host storage disk.

* * * * *